United States Patent
Gandel et al.

(10) Patent No.: US 7,589,445 B2
(45) Date of Patent: Sep. 15, 2009

(54) LINEAR ACTUATOR COMPRISING A BRUSHLESS POLYPHASE ELECTRIC MOTOR

(75) Inventors: Pierre Gandel, Montfaucon (FR); Daniel Prudham, Thise (FR); Jean-Daniel Alzingre, Larnod (FR); Antoine Foucaut, Montarlot les Rioz (FR)

(73) Assignee: Moving Magnet Technologies, M.M.T., Besancon (FR)

( * ) Notice: Subject to any disclaimer, the term of this patent is extended or adjusted under 35 U.S.C. 154(b) by 142 days.

(21) Appl. No.: 10/505,246

(22) PCT Filed: Mar. 4, 2003

(86) PCT No.: PCT/FR03/00687

§ 371 (c)(1),
(2), (4) Date: Apr. 22, 2005

(87) PCT Pub. No.: WO03/075434

PCT Pub. Date: Sep. 12, 2003

(65) Prior Publication Data

US 2005/0218727 A1    Oct. 6, 2005

(30) Foreign Application Priority Data

Mar. 5, 2002   (FR) ................................. 02 02749
Oct. 28, 2002  (FR) ................................. 02 13448

(51) Int. Cl.
*H02K 7/06*    (2006.01)
*H02K 7/10*    (2006.01)

(52) U.S. Cl. .......................... 310/80; 310/68 B; 310/20

(58) Field of Classification Search .................. 310/12, 310/80, 20, 49 R, 68 B; 123/568.23, 568.24; 251/129.11–129.13, 251.11–251.13
See application file for complete search history.

(56) References Cited

U.S. PATENT DOCUMENTS

| 3,161,074 | A |   | 12/1964 | Wilke et al. |
| 3,824,420 | A | * | 7/1974  | Stegeman et al. ............. 310/80 |
| 4,378,767 | A | * | 4/1983  | Kobashi et al. ........ 123/339.26 |
| 4,463,291 | A |   | 7/1984  | Usry |
| 4,501,981 | A | * | 2/1985  | Hansen ...................... 310/49 R |
| 4,553,056 | A |   | 11/1985 | Pfister |
| 4,742,989 | A | * | 5/1988  | Akagi ................... 251/129.05 |

(Continued)

FOREIGN PATENT DOCUMENTS

DE    27 43 908 A    4/1979

(Continued)

OTHER PUBLICATIONS

Translation of JP 61-201972, "Electromotive Governor Valve", Masahide Takanaka, Sep. 1986.*

(Continued)

*Primary Examiner*—Karl I Tamai
(74) *Attorney, Agent, or Firm*—Egbert Law Offices PLLC

(57) ABSTRACT

A linear actuator includes a brushless polyphase synchronous electric motor having a stator and a rotor. The rotor acts on a control element via a driver which can transform the rotation movement thereof into a linear movement over several rotations. Preferably, the inventive actuator comprises elastic and/or magnetic return device which can systematically return the control element to a reference position when the power supply to the motor is cut. The motor has a position detection device which, together with an electronic control unit, is used for the automatic control and regulation of the position of the rotor and, therefore, the control element.

6 Claims, 2 Drawing Sheets

U.S. PATENT DOCUMENTS

| | | | | |
|---|---|---|---|---|
| 4,915,083 A | * | 4/1990 | Hewette et al. | 123/568.24 |
| 4,995,585 A | * | 2/1991 | Gruber et al. | 251/30.03 |
| 5,041,748 A | * | 8/1991 | Huber | 310/80 |
| 5,402,022 A | | 3/1995 | Bertolini et al. | |
| 5,451,824 A | * | 9/1995 | Sieber et al. | 310/80 |
| 5,731,640 A | * | 3/1998 | Dietrich et al. | 310/12 |
| 5,749,350 A | | 5/1998 | Bender | |
| 5,931,142 A | | 8/1999 | Gerling | |
| 6,005,317 A | * | 12/1999 | Lamb | 310/103 |
| 6,116,106 A | * | 9/2000 | Miyoshi | 74/89.37 |
| 6,182,645 B1 | * | 2/2001 | Tsuchiya | 123/568.23 |
| 6,191,506 B1 | * | 2/2001 | Wright | 29/598 |
| 6,603,239 B1 | * | 8/2003 | Michely et al. | 310/328 |
| 6,719,103 B1 | * | 4/2004 | Kapaan et al. | 188/72.8 |
| 6,734,582 B2 | * | 5/2004 | Corbett et al. | 310/12 |
| 6,840,200 B2 | * | 1/2005 | Miller | 123/90.11 |
| 6,843,239 B2 | * | 1/2005 | Fensom et al. | 123/568.21 |
| 2005/0218727 A1 | * | 10/2005 | Gandel et al. | 310/12 |

FOREIGN PATENT DOCUMENTS

| | | | |
|---|---|---|---|
| DE | 100 03 129 A | | 8/2001 |
| EP | 0 448 515 A | | 9/1991 |
| JP | 62-201972 | * | 9/1986 |
| JP | 02303343 | * | 12/1990 |
| JP | 06-249355 | * | 9/1994 |
| WO | WO 99 10965 A | | 3/1999 |

OTHER PUBLICATIONS

Translation of JP 02-303343, "Linear Motion Motor", Okabe Tadashi, Dec. 1990.*

* cited by examiner

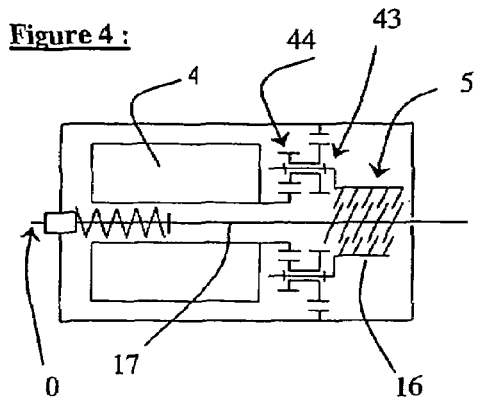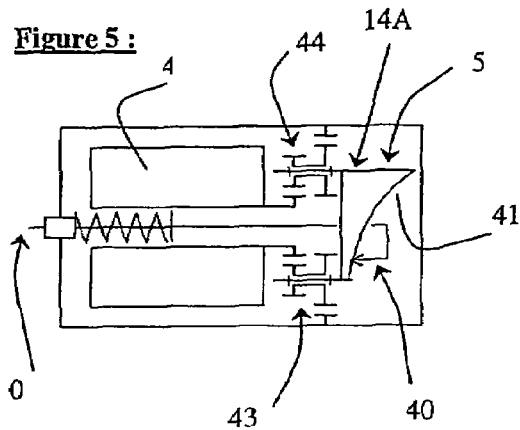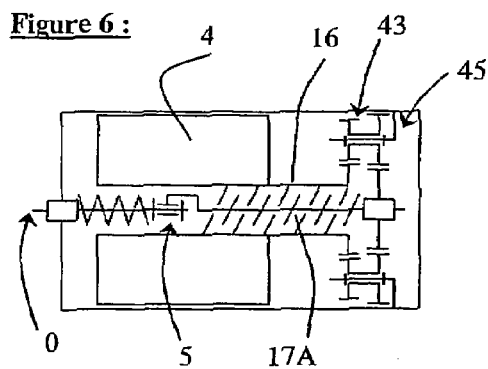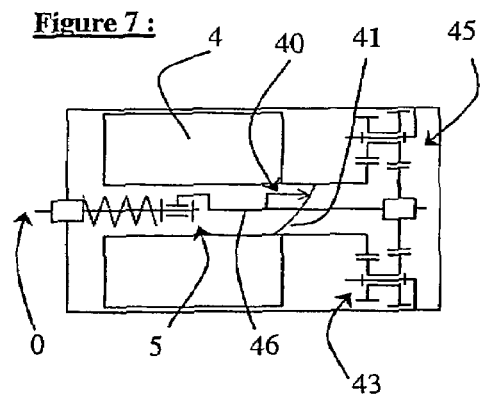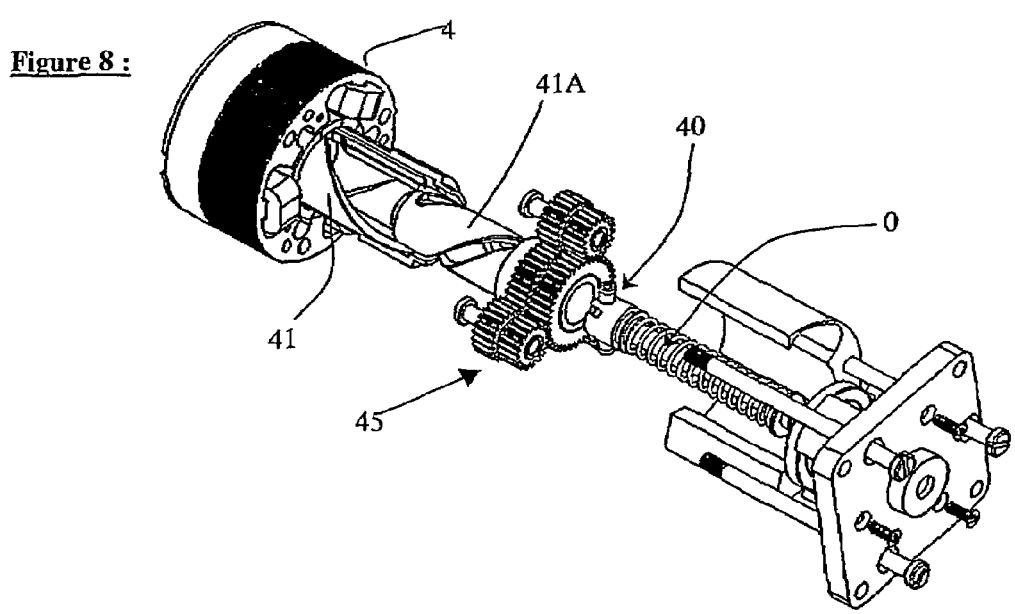

LINEAR ACTUATOR COMPRISING A BRUSHLESS POLYPHASE ELECTRIC MOTOR

BACKGROUND OF THE INVENTION (1) Field of the Invention

The invention relates to a linear actuator comprising a brushless multiphase electric motor, including a stator and a rotor, the latter acting on a control organ through driving means designed capable of converting, over several revolutions, its rotational movement into a linear displacement.

The present invention relates to the field of the linear actuators generally including a brushless multiphase electromagnetic motor. It finds a very particular application in the case in which a control in the form of a fast linear displacement is sought, as is necessary, for example, for controlling the valve of a device for re-circulating the exhaust gases of a diesel motor, but also for controlling air-inlet valves.

(2) Description of the Prior Art

Nowadays, for such applications use is made of direct-drive linear electromagnetic actuators or linear actuators based on an electric stepping motor using a system for converting the rotational movement into a linear displacement, such systems being capable of adopting various embodiments. In particular, cam systems, pinion and rack systems and screw and nut systems are known.

From DE-A-100 03 129 is known in particularly a linear actuator including a stepping motor provided with a rotor provided, on its periphery, with magnets of alternate polarity in front of pole shoes of a stator. It includes at least two electric field coils allowing to control the motor through electronic switching. It should be noted that in the axial extension of the stator is provided for a Hall sensor surrounding the rotor as a position-detection device.

Turning back to the rotor, it includes, internally and coaxially, a tapped nut engaging a threaded rod immobilized in rotation.

Thus, from the action of the rotation of the rotor and, hence, of the nut integral with the latter, results a displacement in translation of the threaded rod which substantially forms the control organ.

The problem raised by this kind of linear actuator with a multiphase motor consisted in that, in the event of failure of the motor, even if due to an interruption of power supply, the control organ and, hence, the part, for example the valve on which it acts, remains in the position reached before the failure occurs. Therefore, since it does not return into a safety position, this can result into a more serious dysfunction at the level of the unit in which this controlled part fits.

When taking, for example, the particular case of the control of valves of a device for re-circulating exhaust gases of a diesel motor, it is imperative that these valves be maintained closed on their seat, so as to prevent the exhaust gases from being re-circulated when such a failure occurs, for otherwise the operating conditions of the motor itself will be altered.

Therefore and as described in U.S. Pat. No. 4,501,981, there has been devised to provide this kind of actuator with a stepping motor with springy restoring means capable of restoring the threaded rod into a reference position in the event of power fail. Though these springy restoring means can adopt the shape of a helical spring acting directly on the threaded rod, in a second embodiment described in this document U.S. Pat. No. 4,501,981 a helical spring can also act on the rotor in order, in the event of such a power fail, to control the later in rotation and to restore the control organ into its reference position.

However, it should be noted that a D.C. multiphase stepping motor raises a problem of response time and jerked displacement since a magnetized pole of the rotor has a privileged balanced position when it is placed in front of a pole of the stator or when a transition between two magnetic poles is located in front of such a stator pole.

The residual torque is thus a periodic function of the angular position the frequency of which depends on the number of magnetic poles and on the number of stator poles.

Finally, the stepping motor has two kinds of significant drawbacks for both ensuring a fast control of an organ and allowing the latter to be easily restored into a reference position under the action of a springy restoring:

the residual torque, which corresponds to the torque without current of the motor, is excessive and prevents an easy restoring into a reference position, the principle of operation of the stepping motor only allows controlling a displacement, without having the possibility of checking whether the imposed sequence has been carried out correctly.

In this respect, in FR-A-2,754,953 has described a brushless and electronically switched multiphase motor having a low residual torque. In particular, the stator portion of this motor has at least two W-shaped circuits including, each, an electric coil surrounding the central stator pole. These W-shaped circuits are so arranged that, when one central stator pole is located in front of a magnetic transition, the other central stator pole is located roughly in front of a magnetic pole. The pole shoes of these central stator poles of the two W-shaped circuits belong to different phases and are angularly separated by 120°. Thus, the shape of the W-shaped stator circuit ensures the closing of the field lines between the central pole which receives the coil and both adjacent poles.

SUMMARY OF THE INVENTION

Therefore, within the framework of an inventive step it has been devised to associate with such a linear electric actuator with a brushless multiphase motor:

springy and/or magnetic restoring means allowing to systematically restore into a reference position the control organ on which has to act the rotor in the event of an interruption of power supply to the motor;

and a position-detection device contributing, in combination with an electronic control unit, to the control or adjustment of the position of the rotor, hence of the control organ.

According to an embodiment of the invention, these springy and/or magnetic restoring means are in the form of at least one springy and/or magnetic element for controlling the rotation of the rotor.

It is obvious that, when the actuator operates normally, the motor must oppose the reverse action of such a springy and/or magnetic element for controlling the rotation. Accordingly, the motor must be sized so as to produce a sufficient torque to be able to bring the control organ from one extreme position to another, for example from a closed position of a valve to its open position, and, at the same time, to counteract the resistive torque provided by the springy and/or magnetic element. Conversely, it should be designed capable of systematically restoring this control organ into its reference position.

In this respect, it should be noted that such a springy and/or magnetic element must provide a lower torque as the motor has, in turn, a reduced residual torque.

It should also be noted that the action of this springy and/or magnetic element acting directly on the rotor also counteracts the performances of the motor from the point of view of its maintenance torque, i.e. the continuous torque it is capable of producing to maintain the controlled part, for example a valve, in open position.

According to another embodiment, the springy restoring means are designed in the form of at least one springy and/or magnetic element capable of acting directly on the control organ. This obviously implies that the driving means for converting the rotational motion of the rotor into a linear movement are reversible. Now, in a simple design corresponding to the state of the art described in FR-A-2,754,953 in the form of a screw and nut unit, the reversible nature of such driving means directly depends on the reduction they provide. All things considered, the larger the transmission ratio, the smaller will be the effort the springy and/or magnetic element will have to produce for restoring it, through a direct action on the control organ, into a reference position. Obviously, the motor must then be capable of providing a larger torque, in order to be able to act on this control organ.

Thus, according to a third embodiment, springy and/or magnetic restoring means have been devised in the form of a combination of a springy and/or magnetic element for controlling the rotation of the rotor and another one acting directly on the control organ, both acting for the same purpose.

It should also be noted that the combination of such springy and/or magnetic elements allows minimizing the contact pressures at the interface of the moving parts of the driving means designed capable of converting the rotational motion into a linear displacement, such contact pressures resulting into degrading, in the course of time, the friction coefficient between these parts, which coefficient the reversibility of the movement is also subjected to.

Another advantage resulting from the present invention consists in that the springy and/or magnetic element or elements contribute to eliminating the mechanical backlash between the moving parts, which allows avoiding or reducing the operating noises of the actuator as well as the shocks during the transitional phase of starting and stopping.

Also advantageously, with the driving means for converting the rotational motion of the rotor into a linear movement is associated an independent reversible reduction device. This uncoupling of the speed-reduction and motion-conversion functions allows using a large pitch at the level of the helical system, of the screw and nut type or the like, ensuring the latter function. The reduction device is then independently parameterized, knowing that its output is substantially constant with respect to the reduction. Finally, this separation of the functions provides, for the same reduction, a higher total output, compared to the use of only a helical system.

Further objects and advantages of this invention will become clear during the following description.

The understanding of this description will be made easier when referring to the attached drawings.

BRIEF DESCRIPTION OF THE DRAWINGS

FIG. 4 is a schematic view of the kinematics of an actuator including a reduction gear in the form of an epicyclical gear and driving means designed capable of converting the rotational motion into a linear displacement in the form of a screw and nut system;

FIG. 5 is a view similar to FIG. 4, the driving means designed capable of converting the rotational motion into a linear displacement adopting the form of a roller and of a cam;

FIG. 6 is a schematic view of the kinematics of an actuator including a reduction gear in the form of a differential gear and driving means designed capable of converting the rotational motion into a linear displacement in the form of a screw and nut system;

FIG. 7 is a view similar to FIG. 6, the means designed capable of converting the rotational motion into a linear displacement adopting the form of a roller and a cam;

FIG. 8 is a schematic view of an embodiment corresponding to the design according to FIG. 7, but with two cams including crossed profiles and the relative rotation of which through the differential gear induces the sliding of a roller in the form of a pin causing the translation of the control organ.

DETAILED DESCRIPTION OF THE PREFERRED EMBODIMENTS

Figures 1, 2, 3:
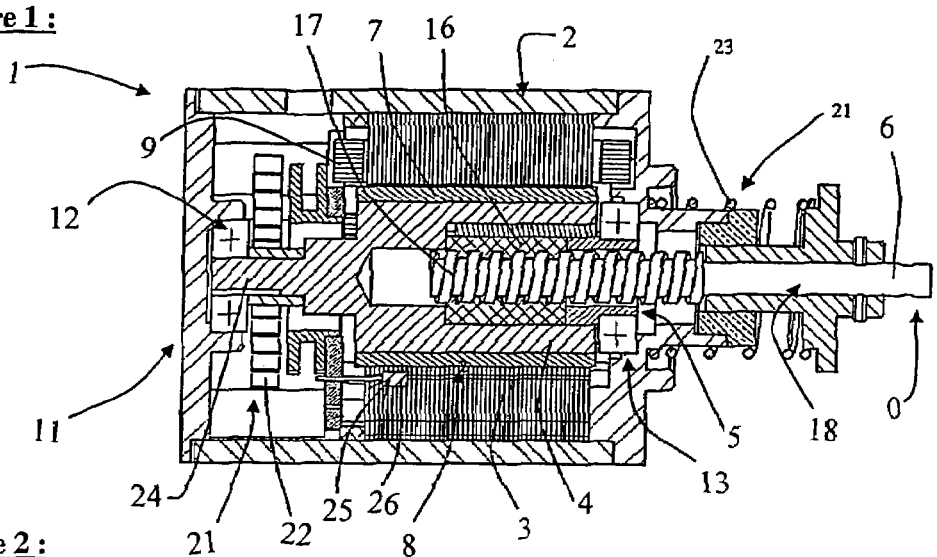
FIG. 1 is a schematic and axial cross-sectional view of a linear electric actuator with a multiphase motor according to the invention.
FIG. 2 is a view similar to FIG. 1, showing a second embodiment that integrates a linear position sensor.
FIG. 3 is a cross-sectional view showing a third embodiment in which the rotor is fitted like a nut on its axis defined in the form of a threaded rod.

As shown in FIGS. 1 and 2 of the attached drawing, the present invention relates to a linear electric actuator 1 including brushless multiphase D.C. electric motor 2, comprised of a stator 3 and a rotor 4, the latter acting on driving means 5 which are designed capable of converting, over several revolutions, the rotational motion of this rotor 4 into a linear displacement 5.

In the figures of the attached drawing are shown embodiments of these driving means 5, but it should be noted that the present invention is by no means limited to them. In particular, such driving means 5 can adopt the form of devices with cams, pinion and rack, etc., without departing from the framework and the spirit of this invention.

Turning back to the motor 2, its rotor 4 preferably includes N pairs of rotor poles 7 radially magnetized in an alternate direction, N being greater or equal to 4, while being different from a multiple of 3.

Furthermore and for achieving an as small as possible magnetostatic torque in the absence of current, the stator 3 includes, in turn, preferably P×9 identical poles 8 spaced apart by 40°/P, said stator poles 8 being grouped consecutively three by three, so as to define a phase made up of a W-shaped circuit, grouping three consecutive stator poles, the central stator pole 8 carrying the coil 9 of the corresponding phase 10.

Moreover, the central stator poles 8 of two W-shaped circuits, each corresponding to a phase, are angularly spaced apart by 120°.

This motor 2 is of the brushless type, i.e. the coils 9 and, hence, the phases 10 are at least two in total and are supplied with power through an electronic control unit, not shown.

The motor 2 is accommodated in a casing 11 including, at one and/or the other of its ends, bearings 12, 13, maintaining the rotor 4 in rotation.

Turning back to the driving means 5, they can be defined, as shown in FIGS. 1, 2, 3, 4 and 6, by a screw and nut system 14. In particular and as can be seen in FIGS. 1, 2, 4 and 6, at the level of an axial bore 15, the rotor 4 carries a nut 16 engaged with a coaxial threaded rod 17; 17A eventually emerging out of the casing 11 at least at one of its ends 18. Thus, through the linear displacement which is imparted to it by the rotor 4, this threaded rod 17, 17A defines, directly or indirectly, the control organ O of the actuator 1.

In the embodiment corresponding to FIG. 3, the nut 16 carried by the rotor 4 is mounted moveable on a fixed threaded rod 17B. Thus, during the control of the rotation of the motor 2, the rotor 4 moves according to a helical motion under a stator 3 extended for this purpose and transmits its linear displacement to the control organ O immobilized in rotation by adequate means.

In these embodiments corresponding to FIGS. 1, 2 and 3, this screw and nut system 14 also ensures the function of a reduction gear and in this case it is preferably of the ball screw type.

In the framework of the designs corresponding to the FIGS. 5 and 7, these driving means 5, designed capable of converting the rotational motion of the rotor 4 into a linear displacement adopt the form of a system 14A of the type roller 40 and cam 41. All things considered, the stem 42, substantially corresponding to the control organ O, carries roller 40 evolving along a circular cam 41 put into rotation, directly or indirectly, as will be described below, by the rotor 4.

The solution corresponding to FIG. 8 uses driving means 5 including the (or one) first cam 41 and one second cam 41A with crossed profiles designed capable of being rotated with a differential speed, as is explained below in the description, to impart to a roller 40A, in the form of a pin, an axial sliding capable of causing the translation of the control organ O.

This configuration has a higher output than that achieved with only a cam with a helical profile against which rests a roller likely to move exclusively in a rectilinear way.

Turning back in particular to the embodiment corresponding to FIGS. 1 and 2, in a reference position, this threaded rod 17 abuts, through its end 19 inserted in the bore 15 of the rotor 4, against a shoulder 20 which internally includes this bore 15.

By way of an example, within the framework of an application to the control of a valve of a device for re-circulating exhaust gases of a diesel motor, the actuator can be aimed at controlling, starting from a closed position, the opening of a valve. In particular, the closed position corresponds in this case to a reference position.

In the embodiment shown, this reference position can correspond to the outward position of the threaded rod 17, so that the power supply to the motor 2 and the rotation generated by the rotor 4 result into drawing the threaded rod 17 into its bore 15 in order, in the above example, to control the opening of said valve. This position can be maintained through the maintenance torque provided by the motor when its power supply is maintained.

According to the invention, this linear electric actuator includes, in combination, springy and/or magnetic restoring means 21 for restoring, in the event of interruption of power supply to the motor, its control organ O, here the threaded rod 17, into its reference position.

In fact, these springy and/or magnetic restoring means 21 are defined capable of inducing several revolutions of the rotor 4, in order to ensure this restoring into reference position of the control organ O.

Such springy and/or magnetic restoring means 21 can consist of a springy and/or magnetic element for controlling the rotation of the rotor 4 which, when said control organ O is restored from its reference position into any position, is put under constraint, so that it can be restored, through rotation of the rotor 4, into this same reference position.

These springy and/or magnetic restoring means 21 can also be defined by a springy and/or magnetic element 23 acting directly on said control organ O in order to restore it into said reference position from any position into which it was previously brought by the motor 2, this of course in the event of an interruption of the power supply to the latter.

Turning back to the springy and/or magnetic element 22 capable of imparting a rotational motion to the rotor 4, it can be defined, as shown in FIGS. 1 and 2, in the form of a helical spring engaged with the axis 24 of this rotor 4 extending beyond the stator 3, on the opposite side with respect to the emerging end 18 of the threaded rod 17.

The advantage of such a helical spring consists in that it is of a reduced size and which, in the case of small actuators, is capable of producing a sufficient torque to achieve the result sought. In particular, such a helical spring is capable of operating over several revolutions, even of producing a substantially constant restoring torque over the full travel distance of the actuator.

It should be noted that the restoring torque Co this springy element should produce must be such that:

$$Co > C_{friction} + C_{residual}$$

All things considered, this torque must be able to overcome the resistive torque produced by the frictions and the residual torque, i.e. the magnetostatic torque in the absence of current of motor 2. It is therefore important that it is as small as possible, hence the design of the motor as defined above. Indeed, though it is appropriate to make the springy and/or magnetic element of higher stiffness, as a matter of fact in order to be capable of opposing a larger resistive torque, correlatively it is necessary to oversize the motor so that it is capable of producing a defined torque, not only to allow it to ensure the function of a requested actuator, but also to counteract the resistive torque which is necessarily provided by this springy element.

In the case of use of an elastic and/or magnetic element 23 acting directly on the control organ O, here the threaded rod 17, the driving mechanism 5 must compulsorily be of a reversible type.

In the case of a system as described, threaded rod 17 and nut 16, the criterion for the selection of the pitch is such that:

$$P > \mu \pi Dia$$

where p is the pitch, Dia is the average diameter of the screw and μ is the friction coefficient between the threaded rod 17 and the nut 16.

In such a motion-conversion system, the axial force F necessary to achieve the reversibility is such that:

$$F > 2\pi C/p\eta'$$

where

C: residual torque in operation without current (magnetostatic torque without current+friction torque at the bearings)

η': output of translation to rotation of the screw

Though it is also important here that the magnetostatic torque without current is as small as possible so as to minimize the force necessary for the reversibility, the output η' should also be maximized. Indeed, this output is a function of the friction coefficient which must thus be minimized. Now, in the course of time and under the action of the contact pressures at the interface between threaded rod and nut, this friction coefficient μ is degraded and does no longer allow to be so reversible.

Therefore and within the framework of a preferred embodiment as shown in FIGS. 1 and 2, the actuator includes, as springy and/or magnetic restoring means 21, both a springy and/or magnetic element capable of causing the rotor to rotate in a defined direction so as to restore the control organ O into its reference position and a springy and/or magnetic element 23 capable of acting directly on this control organ O for this purpose.

The peculiarity of the helical systems, and in particular of the screw and nut system 14, is that they have a output varying according to the helix angle. Therefore, when a high reduction coefficient is sought, which implies a small angle, this results into a low direct output and especially reverse output which are highly penalizing as regards the springy restoring function of the actuator.

The solution as defined in FIG. 3 allows to partly cope with these low outputs. In fact, in this case, the screw and nut system 14 does no longer require an anti-rotation function and the nut 16, connected to the rotor 4, describes a helical motion on the fixed threaded rod 17B, and transmits the translation to the exit shaft 0 through a single bearing.

Furthermore, it has advantageously been devised to distinguish, at least partly, the motion-conversion and reduction functions, by associating with said driving means 5 an independent reversible reduction device 43.

As can be seen in FIGS. 4 and 5, such a reversible reduction device can adopt the form of an epicyclical gear 44 through which rotor 4 attacks, according to the embodiment of FIG. 4, the nut 16 engaged with the threaded rod 17, the latter being designed with a large pitch and therefore perfectly reversible. In the design according to FIG. 5 is used a system 14A comprised of a roller 40 and a cam 41.

In FIGS. 6 to 8, this reduction device 43 is in the form of a differential gear 45 through which is created a differential rotation speed between, in the case of FIG. 6, the nut 16 carried by the rotor 4 and a nut 17A integral in translation and freely rotating of the control organ O.

In the case of FIG. 7, the differential gear 45 is intercalated between the cam 41 carried by the rotor 4 and the roller 40 integral with the exit shaft 46 of this differential gear 45. Here too, this exit shaft 46 is integral in translation, while being freely rotating, with the control organ O.

In these various architectures, the use of a differential gear between the two parts performing the conversion of the motion has the advantage of being capable of carry out a significant and always reversible reduction in a small size.

The principle of this differential reduction gear 45 consists in driving, at different, close speeds, both organs allowing performing the motion conversion:

the screw 17A and the nut 16 in the case of FIG. 6.

The roller 40 and the cam 41 in the case of FIG. 7.

Obviously, the closer the speeds of both motion-conversion organs, the larger is the reduction achieved through the differential gear.

In the configuration according to the FIG. 8, the rotor 4 controls the rotation of the first cam 41 as well as, through the differential gear 45, the second cam 41A with a reversed profile. The differential speed of these cams 41 and 41A imparts to the roller 40, in the form of a pin, an axial displacement which is re-transmitted to the control organ O.

In the latter case, the conversion of the motion is achieved by three different organs: both cams 41 and 41A of opposite profiles and the pin 40 resting against the two helices under the action of the restoring springs.

The pin 40 is driven by the cam 41 and retained by the other one 41A, so that it is subjected to a translation and rotational motion, which rotation is different from the speeds of said cams.

The motion of this pin 40 can then be transmitted to the control organ O through a pivot connection, so as to preserve only the translation wanted at the outlet of the actuator.

It is important to note that the motion conversion by two helices has an intrinsic reduction of the movement.

Indeed, since the pin 40 evolves along the two helical profiles corresponding to the cams 41, 41A, there is required, in order to induce a given axial displacement, a larger relative rotation of these cams 41 and 41A in the system as shown in FIG. 8 than that required in the case of a system with one cam as shown in FIG. 7.

Thus, in the case of FIG. 8, there is a reduction of movement generated by the differential reduction gear to which is added an additional reduction inherent to the use of two helical profiles.

Moreover, this conversion technique allows to avoid blocking in rotation the roller defined by the pin, this contrary to the traditional helical systems. Hence, it avoids the losses due to friction this type of blocking normally generates and the mechanical output is therefore increased accordingly.

Finally, this particular motion conversion has the following advantages:

a larger motion conversion than that achieved with a traditional system with only one helical profile or screw and nut, a higher output than these same systems.

The design shown in FIG. 8 allows to note that these two concepts of differential drive and conversion with double helix are easily matched and allow achieving an interesting actuator in terms of reduction of motion, output and compactness.

It is clearly stated that the present invention is in no way limited to these various embodiments, whether of the driving means 5 or of the reduction device 43.

FIGS. 1 and 2 correspond to embodiments of the invention which differ mainly by their respective position-detection device 25, 25A.

Thus, according to a first embodiment, this device 25 consists, as shown in FIG. 1, of magneto-sensitive elements, such as Hall sensors 26, integrated in a known way known in the stator 3 and designed capable of detecting the magnetic poles of the rotor 4 inside the motor 2. Thus, knowing the geometry of the latter and thanks to an electronic control unit, the signals delivered by these Hall sensors 26 allow to derive the angular position of the motor 2 and to carry out a control or an adjustment of the position at a pre-set value without using an additional position sensor or encoder.

In the event the linear positioning resolution by using the auto-switching signals as position measure is insufficient for the application involved, there can be used, as a position detection device 25A, a linear position sensor 27 as shown in FIG. 2. The linear position is then known with respect to a reference position established by a mechanical stop. Moreover, knowing the linear position as well as the geometry of the actuator, the angular position of the rotor 4 of the motor can be derived and, thus, the switching over of the current supply to the phases can occur, in this case, without using any Hall sensor.

In particular, according to the embodiment shown in this FIG. 2, the threaded rod 17 defining the control organ O passes through rotor 4 on the side of its end 19 opposite the one 18 acting more particularly as a control organ, in order to co-operate with said position sensor 27 of a contactless electromagnetic type, as described in WO-93.23720.

In particular, this sensor 27 includes a permanent magnet 28 located in the extension of the threaded rod 17 and made integral with the latter at its end 19. This magnet 28 moves between a stator 29 and a yoke 30. An analogue Hall sensor 31 is placed in a measuring gap provided for in the yoke 30. Thus, according to the linear position of the threaded rod 17, hence of the magnet 28, the Hall sensor 31 sees variations of magnetic fields in the measuring gap. It then sends a linear position signal.

Obviously, further types of position-detection devices can be contemplated in association with a linear electric actuator according to the invention.

The invention claimed is:

1. A linear actuator apparatus comprising:
   a brushless reversible multiphase synchronous electric motor having a stator and a rotor;
   a control organ having a retracted position and an extended position relative to said electric motor;
   a driving means for converting a rotational movement of said electric motor into a linear and reversible displacement of said control organ so as to drive said control organ from said retracted position toward said extended position over several revolutions of said electric motor, said driving means having a first cam and a second cam with crossed profiles, said first and second cams being rotatable at different speeds, said first and second cams acting on a roller so as to cause an axial sliding movement of said roller, said roller acting on said control organ, said roller being a pin member;
   a reversible reduction mechanism being separate from and cooperative with said driving means;
   a restoring means cooperative with said control organ for restoring said control organ to said retracted position when a power supply to said electric motor is interrupted, said restoring means being a spring or a magnet, said restoring means acting at least partially directly onto said control organ so as to restore said control organ via said driving means into said retracted position; and
   a position detecting means on said electric motor for adjusting a position of said rotor and said control organ between said retracted position and said extended position.

2. The apparatus of claim 1, said restoring means having said spring or said magnet for controlling a rotation of said rotor so as to restore said control organ to said retracted position.

3. The apparatus of claim 1, said restoring means having said spring or said magnet acting directly on said control organ so as to restore said control organ to said retracted position.

4. The apparatus of claim 1, said restoring means comprising a first said spring or said magnet for controlling the rotation of said rotor and a second said spring or said magnet acting directly on said control organ so as to restore said control organ to said retracted position.

5. The apparatus of claim 1, said position-detecting means having a plurality of magneto-sensitive elements integrated into said stator for detecting magnetic poles of said rotor.

6. The apparatus of claim 5, said position-detecting means having a linear position sensor cooperative with said control organ.

* * * * *